United States Patent
Yu

(10) Patent No.: US 10,242,226 B2
(45) Date of Patent: Mar. 26, 2019

(54) METHOD AND APPARATUS FOR CAPTURING SCREEN ON MOBILE DEVICE

(71) Applicants: HISENSE MOBILE COMMUNICATIONS TECHNOLOGY CO., LTD., Qingdao (CN); HISENSE USA CORPORATION, SUWANEE, GA (US); HISENSE INTERNATIONAL CO., LTD., Qingdao (CN)

(72) Inventor: Deyi Yu, Qingdao (CN)

(73) Assignees: Hisense Mobile Communications Technology Co., Ltd., Qingdao (CN); Hisense USA Corporation, Suwanee, GA (US); Hisense International Co., Ltd., Qingdao (CN)

( * ) Notice: Subject to any disclaimer, the term of this patent is extended or adjusted under 35 U.S.C. 154(b) by 0 days.

(21) Appl. No.: 15/369,800

(22) Filed: Dec. 5, 2016

(65) Prior Publication Data
US 2017/0186127 A1     Jun. 29, 2017

(30) Foreign Application Priority Data
Dec. 29, 2015    (CN) .......................... 2015 1 1022560

(51) Int. Cl.
    *G06F 17/20*     (2006.01)
    *G06F 21/62*     (2013.01)
    *G06F 3/0484*     (2013.01)

(52) U.S. Cl.
    CPC ...... *G06F 21/6245* (2013.01); *G06F 3/04845* (2013.01)

(58) Field of Classification Search
None
See application file for complete search history.

(56) References Cited

U.S. PATENT DOCUMENTS 7,600,267 B2 * 10/2009 Bauchot .................. G06F 21/84
                                                   726/33
8,132,102 B2 * 3/2012 De Medeiros .......... H04L 51/04
                                                   715/715

(Continued)

FOREIGN PATENT DOCUMENTS

| CN | 101470787 A | 7/2009 |
| CN | 101470787 A | 7/2009 |

(Continued)

OTHER PUBLICATIONS

The Chinese First Examination Report of corresponding China patent application No. 201511022560.8, dated May 17, 2018.

(Continued)

*Primary Examiner* — Shahid K Khan
(74) *Attorney, Agent, or Firm* — Brinks Gilson & Lione

(57) ABSTRACT

Embodiments of the disclosure provide a method and an apparatus for capturing a screen on a mobile device, the method including: receiving, at the mobile device, a screen-capturing request for a current interface, where the current interface includes first data, and the first data includes personal information; and generating, according to screen-capturing request, a screen capture image for the current interface, where the first data in the current interface is replaced in the screen capture image with second data which is predefined. These embodiments avoid the need to manually mask an image by starting a dedicated image editing tool to anonymize a screen capture image, thereby significantly lowering the relatively high technical threshold of anonymization processing, reducing the error rate, and improving the modification quality of anonymization. Moreover, the replacement is directly made to the image while the screen is captured without interfering with normal use of reading.

15 Claims, 8 Drawing Sheets

(56) References Cited

U.S. PATENT DOCUMENTS

| | | | |
|---|---|---|---|
| 8,458,278 B2* | 6/2013 | Christie | H04L 51/04 |
| | | | 709/207 |
| 2011/0099182 A1 | 4/2011 | Hayner et al. | 707/754 |
| 2014/0280517 A1* | 9/2014 | White | H04L 67/04 |
| | | | 709/203 |
| 2015/0178502 A1* | 6/2015 | Shin | H04L 51/04 |
| | | | 726/26 |

FOREIGN PATENT DOCUMENTS

| | | |
|---|---|---|
| CN | 103544021 A | 1/2014 |
| CN | 104408686 A | 3/2015 |

OTHER PUBLICATIONS

Second Office Action and Supplementary Search Report received from the State Intellectual Property Office of People's Republic of China for Application No. 2015110225608 dated Oct. 24, 2018 (Chinese language with English translation) (12 pp.).

* cited by examiner

001 — A mobile device receives a screen-capturing request for a current interface, where the current interface includes first data, and the first data includes personal information 002 — Generate a screen capture image for the current interface according to the screen-capturing request, where the first data in the current interface is replaced in the screen capture image with predefined second data

Fig. 1A

101 — When the mobile device receives a screen-capturing request, search for first text data signifying a username in the current interface 102 — Replace the first text data with the predefined second text data 103 — Perform, according to the screen-capturing request, a screen-capturing operation on the interface in which the first text data is replaced with the second text data

Fig. 1B

```
⊞ (0) FrameLayout [0,0][480,800]
  ⊞ (0) View [0,0][480,800]
    ⊞ (0) FrameLayout [0,0][480,800]
      ⊞ (0) LinearLayout [0,0][480,800]
        ⊞ (0) LinearLayout [0,110][480,710]
          ⊞ (0) ListView [0,110][480,710]
            ⊞ (0) RelativeLayout [0,110][480,206]
              ⊞ (0) LinearLayout [0,110][480,206]
                ⊞ (0) RelativeLayout [0,110][480,206]
                  (0) QuickContactBadge [15,119][95,197]
                  (1) TextView:13188888888 [100,119][27
                  (2) TextView:05:40 [411,122][464,151]
                ⊞ (3) LinearLayout [100,162][472,191]
                  (0) TextView:Test [100,162][420,191
                  (1) TextView: Draft [420,164][464,189
⊞ (1) FrameLayout [0,38][480,110]
  ⊞ (0) View [0,38][480,110]
    ⊞ (0) LinearLayout [24,38][90,110]
      ⊞ (0) LinearLayout [24,66][90,92]
        (0) TextView:Message [24,66][78,92]
    ⊞ (1) LinearLayout [384,38][480,110]
      (0) ImageButton [384,38][480,110]
⊞ (2) FrameLayout [0,710][480,800]
  ⊞ (0) LinearLayout [0,710][480,800]
    (0) TextView: New{new} [53,719][240,791]
    (1) TextView:More {more options} [240,719][427,791]
```

Fig. 2C

METHOD AND APPARATUS FOR CAPTURING SCREEN ON MOBILE DEVICE

CROSS-REFERENCE TO RELATED APPLICATIONS

This application claims priority to Chinese Patent Application No. 201511022560.8, filed on Dec. 29, 2015 and entitled "METHOD AND APPARATUS FOR CAPTURING SCREEN ON MOBILE DEVICE", which is hereby incorporated by reference in its entirety.

TECHNICAL FIELD

The present disclosure relates to the technical field of mobile devices, and particularly to a method for capturing a screen on a mobile device and an apparatus for capturing a screen on a mobile device.

BACKGROUND

As mobile communication technology evolves, mobile devices such as mobile phones, tablet computers and smart watches, are increasingly used in people's life, study and work.

Among these mobile devices, third party communication tools are often utilized by users to communicate with other users.

In some scenarios, a user may choose to share his/her conversation records generated when communicating with other users.

For example, an e-commerce vendor may share his/her conversation with a customer regarding a particular issue for other customers to read in case the same issue is encountered.

For another example, a user may share some of his/her most brilliant talks to other friends, so as to spread his/her smart quotes or ideas.

However, when making such sharing, the user typically hopes to share the content of the conversation rather than all the information, so as to protect the parties involved in the conversation. For example, names of the persons participating in the conversation or images containing personal information will not be shared, for the purpose of safeguarding privacy.

SUMMARY

Embodiments of the present disclosure propose a method for capturing a screen on a mobile device, and correspondingly, an apparatus for capturing a screen on a mobile device.

Some embodiments herein disclose a method for capturing a screen on a mobile device, including:

receiving, at the mobile device, a screen-capturing request for a current interface, where the current interface includes first data, and the first data includes personal information; and generating, according to the screen-capturing request, a screen capture image for the current interface, where the first data in the current interface is replaced in the screen capture image with second data which is predefined.

Some embodiments herein further disclose an apparatus for capturing a screen on a mobile device, including a processor and a non-transitory processor-readable medium including computer-executable instructions executed by the computing hardware to perform, on the apparatus, operations including: receiving, at the mobile device, a screen-capturing request for a current interface, where the current interface includes first data, and the first data includes personal information; and generating, according to the screen-capturing request, a screen capture image for the current interface, where the first data in the current interface is replaced in the screen capture image with second data which is predefined.

Some embodiments herein further disclose a non-transitory computer-readable medium, storing an instruction set that, when being executed, causes a machine to perform a method for capturing a screen on a mobile device, where the method includes: receiving, at the mobile device, a screen-capturing request for a current interface, where the current interface includes first data, and the first data includes personal information; and generating, according to the screen-capturing request, a screen capture image for the current interface, where the first data in the current interface is replaced in the screen capture image with second data which is predefined.

BRIEF DESCRIPTION OF DRAWINGS

FIG. 1A is a flowchart illustrating a method for capturing a screen on a mobile device according to some embodiments of the present disclosure;

FIG. 1B is a flowchart illustrating a method for capturing a screen on a mobile device according to some other embodiments of the present disclosure;

FIGS. 2A-2C are schematic structural diagrams illustrating a view group in some embodiments of the present disclosure;

DESCRIPTION OF EMBODIMENTS

Figure 2A:
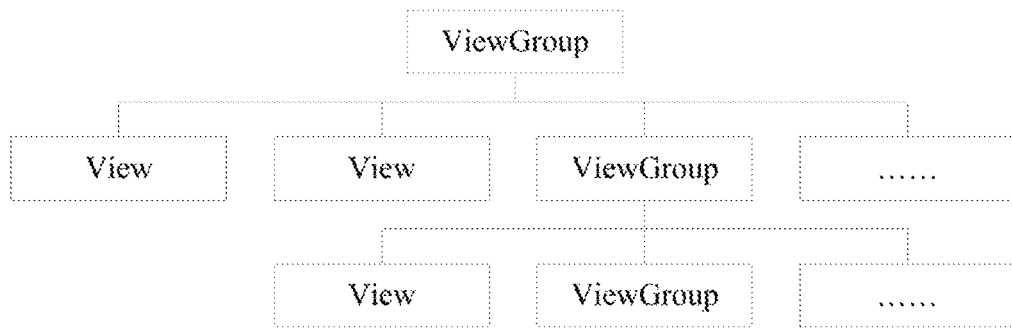

For the purpose of making the aforementioned objectives, features and advantages of the present disclosure more apparent and easy to understand, the present disclosure will be further described hereinafter in combination with the figures and embodiments.

Referring to FIG. 1A, where a flowchart illustrates a method for capturing a screen on a mobile device according to some embodiments herein, the method may include the following steps.

Step 001: the mobile device receives a screen-capturing request for a current interface, where the current interface includes first data, and the first data includes personal information.

It should be noted that, embodiments herein may be applied to mobile devices, e.g. mobile phones, tablet computers, smart watches, etc., which are not limited herein.

The operation systems of these mobile devices may include Android, IOS, Windows Phone, etc., and may typically support communicating using a third party communication tool, such as instant messaging tools, email clients, microblog applications (APPs), forum APPs, etc. Embodiments herein will be described mostly taking the Android system as an example, but the present disclosure is not limited to this.

In cases such as a user intending to present content of a conversation conducted through a third party communication tool, the user may trigger a screen-capturing operation to send the system a screen-capturing request for a current interface. The current interface refers to the user interface currently presented on the mobile device. The current interface includes first data, and the first data may include personal information. That is, the first data is data related to personal information of the user, such as a username, an ID number, a user's head shot, a phone number, a home address, etc. The first data may be text data, image data, or both. For example, the current interface may include text data signifying a username, and/or image data containing user's personal information.

Step 002: generate a screen capture image for the current interface according to the screen-capturing request, where the first data in the current interface is replaced in the screen capture image with predefined second data.

It should be noted that, the screen-capturing operation as used in embodiments herein may refer to screen capturing with anonymity, i.e. capturing a screen after the username or the image containing personal information being anonymized.

Such screen capturing with anonymity may be controlled by a separate screen-capturing portal or a switching option for screen capturing with anonymity in the settings.

Of course, embodiments herein may also provide screen capturing with non-anonymity, i.e. normal screen capturing, leaving the username unchanged.

In some embodiments herein, according to the screen-capturing request and the current interface, a screen capture image is generated for the current interface, where the first data in the current interface is replaced with predefined second data which may also be text data and/or image data. The second data may be different from the first data. Preferably, the second data does not include any personal information. Now the embodiments of the present disclosure will be described in detail through some particular implementations.

Referring to FIG. 1B, where a flowchart illustrates a method for capturing a screen on a mobile device according to some embodiments herein. In these embodiments, the Step 002 will be described in detail mostly taking examples where the first data and the second data are both text data, and the personal information is username information. The present disclosure is by no means limited thereto. Step 002 may include the following steps.

Step 101: when the mobile device receives a screen-capturing request, search for first text data signifying a username in the current interface.

In cases such as a user intending to present content of a conversation conducted through a third party communication tool, the user may trigger a screen-capturing operation to send the system a screen-capturing request for a current interface, and the system may search for the first text data signifying the username in the current user interface (UI).

In some embodiments herein, Step 101 may include the follow sub-steps.

Sub-step S11: search for a view group on a top-most layer in the current interface.

As depicted in FIG. 2A, for example, each of display controls in the Android system inherits from a View, and a ViewGroup is a container containing these controls.

A ViewGroup of a control container class may further include a View and a ViewGroup.

A complex UI may include a plurality of Views and ViewGroups, with the plurality of ViewGroups forming a layered hierarchy in the layout.

Figure 2B:
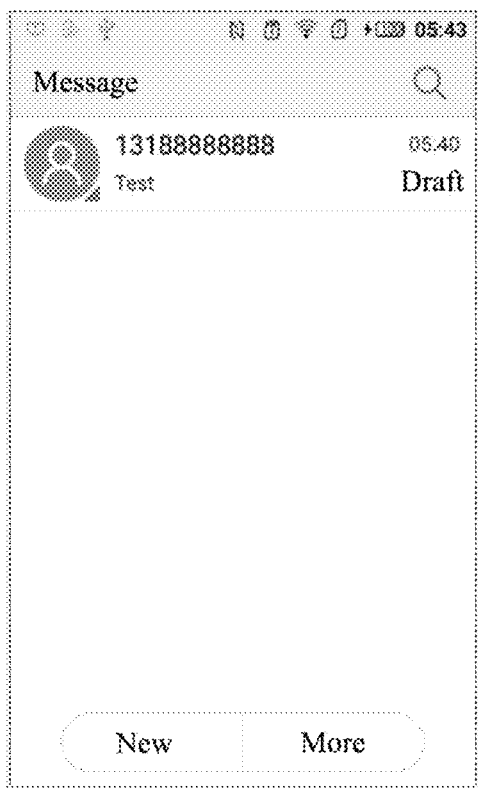

In an example, for a UI as depicted in FIG. 2B, the display of each control may be maintained and controlled through a view layer data structure as shown in FIG. 2C in the Android system.

In FIG. 2C, controls such as a TextView and an ImageButton inherit from a View, while a FrameLayout, a LinearLayout and a RelativeLayout etc. inherit from a ViewGroup.

It should be noted that, a ViewGroup also inherits from a View.

For example, the top-most window of an application in the Android system is referred to as a DecorView, which is derived from a FrameLayout, while the FrameLayout is derived from a ViewGroup. Hence, a ViewGroup on the top-most layer mentioned in the present disclosure refers to the DecorView.

Before an application creates a display window, a DecorView object is created, at which point a BroadcastReceiver is registered to receive from the user a screen-capturing request.

When the user triggers screen capturing, a screen-capturing broadcast is sent to the DecorView. Upon receiving the broadcast, the DecorView may commence redrawing of the window.

Sub-step S12: traverse the view group to search for a text view.

A TextView is typically used to show texts. That is, the TextView has candidate text data. The candidate text data may be any text data in the TextView. The candidate text data may also be text data satisfying preset conditions. The preset conditions may be used to determine whether the text data is data showing personal information. For example, the preset conditions may include a number with 11 digit (representing a cell-phone number), a number with an area code (representing a phone number), a text with a family name (representing a name), and the like. Hence, the username data in the current UI is in one or more TextViews in the ViewGroup.

Sub-step S13: when it is judged that the candidate text data matches predefined username data, the candidate text data is determined as the first text data signifying the username.

In some embodiments of the present disclosure, the username data may be acquired in advance and stored in a database.

In an example, when the number of concurrently communicating users in the conversation is relatively small, the username data may be inputted by the user.

If functionalities such as marking and forwarding are featured in a third-party application, the user may manually copy the username data. If not featured, the user may manually input the username data.

Of course, other than copying or inputting by the user, the username data may also be read from a particular place based on the specification of the UI of the third-party application because that specification is maintained relatively stable over a certain period, or the username data may be acquired in other available manners, which is not limited in embodiments herein.

The username data may be read from the database when recognizing the username. If the candidate text data in the TextView matches the username data, it can be determined that the candidate text data in the TextView is the username.

Step 102: replace the first text data with the predefined second text data.

In some embodiments herein, usernames in the current UI may be anonymized before the screen capturing. That is, the first text data signifying the username are replaced with second text data that does not signify the username.

For example, the second text data may be a "■" (0xA1F6), "anonymous user A", etc.

In one way of such replacing, all the first text data may be replaced with the same second text data, e.g. all usernames are replaced with "● ● ●".

In another way of such replacing, separate first text data may be recognized, and then be replaced with separate second text data.

The term "separate" means single, independent, and without any duplicate.

For example, if usernames in the current UI are "ZHANG San" and "LI Si", the "ZHANG San" and "LI Si" may be replaced with "anonymous user A" and "anonymous user B", respectively, or the like.

In some embodiments herein, Step 102 may include the follow sub-steps.

Sub-step S21: restart measuring, layout planning and drawing for the text view to which the first text data belongs, and replace the first text data with predefined second text data during the drawing; and Sub-step S22: restart measuring, layout planning and drawing for a target view.

The target view is a view in the view group other than the text view to which the first text data belongs.

The system displays the UI by starting from the ViewGroup on the outer-most layer to traverse each View to perform measuring, layout planning, and drawing.

The measuring is mainly used for determining the size of the View control, and for calculating the actual size of the entire View tree, i.e., setting the actual height (corresponding to the property: mMeasuredHeight) and width (corresponding to the property: mMeasureWidth), where the actual width and height of each View control are determined based on the view itself and its parent view.

The call chain for the measuring is as the following.

The property mView (typically a ViewGroup type) of the root object ViewRoot calls the measure( ) method to calculate the size of the View tree, and callback the onMeasure ( ) method of the View/ViewGroup object, to implement functionalities as the following.

1. Set a final size of the present View. This functionality is implemented by calling the setMeasuredDimension( ) method to set the actual height (corresponding to the property: mMeasuredHeight) and width (corresponding to the property: mMeasureWidth);

2. If the View object is of ViewGroup type, the onMeasure( ) method needs to be rewritten to traverse the child views thereof with the measure( ) process;

2.1. The measure( ) process for each child view is implemented by calling the measureChildWithMargins( ) method in the ViewGroup.java parent class. Since the measureChildWithMargins( ) method is merely a transition layer, a more direct approach is to call the measure( ) method of the View object. Thus, in the approach the measure( ) method of the View object is simply called.

The layout planning is mainly used for determining where the View control is to be positioned, and placing the View tree to appropriate places according to sizes of the child views and layout parameters.

The call chain for the layout planning is as the following.

The host.layout( ) initiates layout planning for the View tree, followed by calling back to the layout( ) method in the View/ViewGroup class. The process is as the following.

1. The layout( ) method sets coordinates of the View in the parent view, which are mLeft, mTop, mRight and mBottom (implemented by calling function setFrame( )).

Then the onLayout( ) method is called back (this method is needed in planning layout for each child view if the View is a ViewGroup object).

2. If the View is of ViewGroup type, each childView needs to be traversed, and the layout( ) method of that childView is called to set its coordinates.

The drawing is mainly used for determining the display of the View control.

The performTraversals( ) method of the ViewRoot object calls the draw( ) method to initiate drawing of the View tree, it should be noticed that, only those views requiring a "re-draw", rather than all views of the View tree, are actually re-drawn whenever the drawing is initiated. Internal variables of the View class include a flag bit DRAWN that is added to the View when that view needs to be re-drawn.

The call procedure for the drawing is as the following.

The mView.draw( ) starts the drawing, and the draw( ) method realizes functionalities as the following.

1. Draw background for the View;

2. Make preparation operations for displaying a gradient box;

3. Call the onDraw( ) method to draw the view itself (the method needs to be reloaded for each View, but is not required for the ViewGroup);

4. Call the dispatchDraw( ) to draw the child views (the method does not need to be reloaded if the View type is not ViewGroup, i.e. includes no child view).

It should be noted that, the dispatchDraw( ) method typically does not need to be rewritten in the application since the functional implementation of that method has already been rewritten in the ViewGroup class. However, parent class functions may still be reloaded to implement particular functionalities.

4.1. The dispatchDraw( ) method internally traverses each child view, and calls drawChild( ) to re-callback the draw ( ) method of each child view (It should be noted that, only those views requiring a "re-draw" will call the draw( ) method).

It should be noted that, the dispatchDraw( ) method typically does not need to be rewritten in the application since the functional implementation of that method has already been rewritten in the ViewGroup class. However, parent class functions may still be reloaded to implement particular functionalities.

5. Draw the scrollbar.

In embodiments herein, the ViewGroup on the top-most layer may, upon receiving the screen-capturing request, traverse each child View or child ViewGroup to restart measuring, layout planning and drawing.

By starting from the DecorView to re-draw, each child View or child ViewGroup may be granted equal chance to be re-drawn, which realizes re-drawing of the entire interface of the application, thereby ensuring that all strings to be presented anonymously are re-drawn, effectively preventing a potential problem of leaving some first text data un-replaced.

During a Draw process in the Android system, text data is drawn by calling Canvas.drawText.

Before the DrawText function is executed, the second text data to be drawn is acquired. The first text data is filtered out and replaced with the second text data according to pre-defined string filtering manner. After the filtering and replacing, new second text data to be drawn is generated, and the DrawText function is called to draw the new string to be displayed.

Step 103: perform, according to the screen-capturing request, a screen-capturing operation on the interface in which the first text data is replaced with the second text data.

A mobile device capturing a screen may send a screen-capturing broadcast to the DecorView. Upon receiving the broadcast, the DecorView re-draws the ViewGroup on the top-most layer, and after the re-drawing, the screen capturing is performed by invoking SurfaceFlinger or using other approaches.

The SurfaceFlinger publishes a screen-capturing interface that allows direct screen capturing. Some other approaches may also be used, for example, directly reading from the framebuffer or reading the image buffer of the GPU, which will not be limited herein.

Figure 3A:
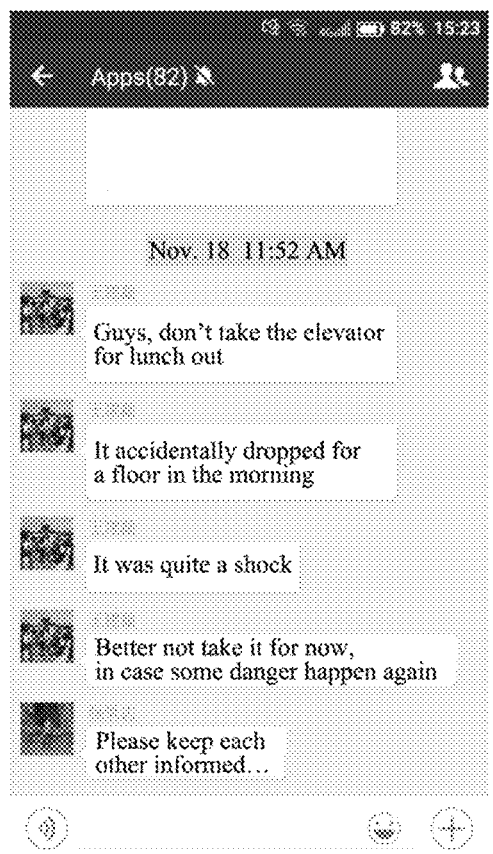
FIGS. 3A-3B are diagrams illustrating screen capturing with anonymity in some embodiments of the present disclosure.
Figure 3B:
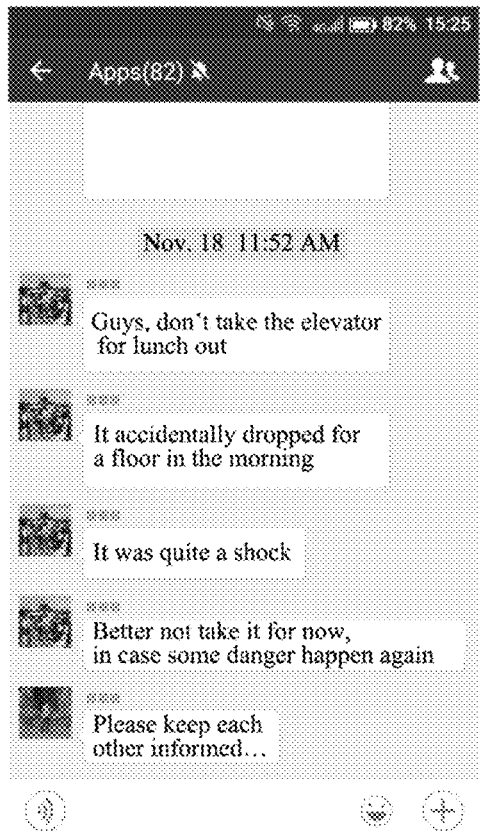

In an application scenario as depicted in FIG. 3A, a user named "WANG Jianlei" in a chat group indicates that the elevator is not safe, and the current user wishes to pass on the information to other users by capturing the screen. In particular, the current user may, for example, select a switching option for screen capturing with anonymity in the settings to send a screen-capturing request to the mobile device for taking anonymized screen capture. Optionally, the mobile device may, following receiving the screen-capturing request, further receive username data inputted from the user. For example, the current user may key in usernames "WANG Jianlei" and "ZHANG Hongzhi". The mobile device may then search for the view group on the top-most layer in the interface to be currently screen-captured, and traverse the view group to search for text views. When a candidate text data matches the "WANG Jianlei" or "ZHANG Hongzhi" inputted by the user, the candidate text data is determined as the first text data signifying the username. Then, the first text data may be replaced with predefined second text data "● ● ●", and the screen-capturing operation is performed for the interface in which the first text data has been replaced with the second text data. In this manner, the username "WANG Jianlei" and "ZHANG Hongzhi" may be replaced with "● ● ●" when the screen capturing is performed, as depicted in FIG. 3B, thereby realizing screen capturing with anonymity, safeguarding the privacy of the user.

In some embodiments herein, screen capturing is performed after the first text data signifying the username has been replaced with the predefined second text data, which protects the user's privacy while avoiding the need to manually mask the image by starting a dedicated image editing tool to anonymize the screen capture image, significantly lowering the relatively high technical threshold of anonymization processing, reducing the error rate, and improving the modification quality of anonymization.

Figure 4:
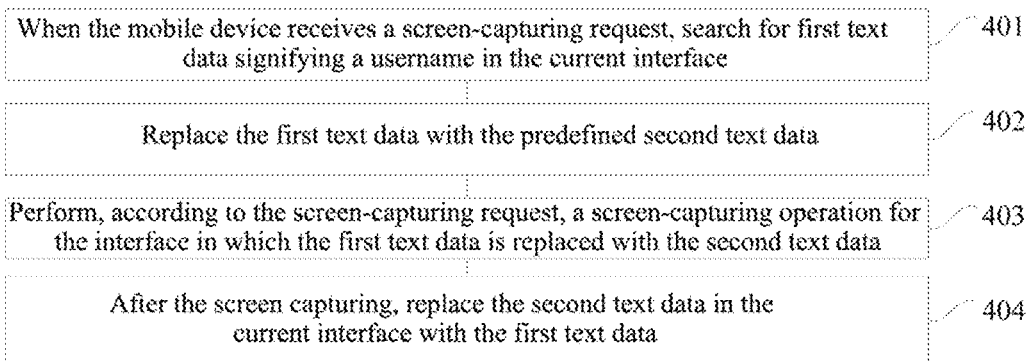
FIG. 4 is a flowchart illustrating a method for capturing a screen on a mobile device according to still some other embodiments of the present disclosure.

Referring to FIG. 4, where a flowchart illustrates a method for capturing a screen on a mobile device according to some embodiments herein, the method may include the following steps:

Step 401: when the mobile device receives a screen-capturing request, search for first text data signifying a username in the current interface.

Step 402: replace the first text data with the predefined second text data.

Step 403: perform, according to the screen-capturing request, a screen-capturing operation for the interface in which the first text data is replaced with the second text data.

Step 404: after the screen capturing, replace the second text data in the current interface with the first text data.

The screen capturing calls a synchronous interface. When the interface call returns, it means that the screen capturing is completed.

If the screen capturing is completed, the second text data in the current interface may be replaced with the first text data to guarantee normal operation of the application.

In some embodiments herein, Step 404 may include the follow sub-steps.

Sub-step S31: restart measuring, layout planning and drawing for the text view to which the second text data belongs in the current interface, and replace the second text data with the first text data during the drawing.

Sub-step S32: restart measuring, layout planning and drawing for a target view.

The target view is a view in the view group other than the text view to which the second text data belongs.

In embodiments herein, the ViewGroup on the top-most layer may, upon receiving a broadcast indicating that the screen capturing is completed, traverse each child View or child ViewGroup to restart measuring, layout planning and drawing.

By starting from the DecorView to re-draw, each child View or child ViewGroup may be granted equal chance to be re-drawn, which realizes re-drawing of the entire interface of the application, thereby ensuring that all strings presented anonymously are re-drawn, effectively preventing a potential problem of leaving some first text data un-replaced.

During a Draw process in the Android system, text data is drawn by calling Canvas.drawText.

Before the DrawText function is executed, the first text data to be drawn is acquired. The second text data is filtered out and replaced with the first text data according to pre-defined string filtering manner. After the filtering and replacing, new first text data to be drawn is generated, and the DrawText function is called to draw the new string to be displayed.

It should be noted that, each TextView has an instance in the memory, and individual instances are mutually separated without any cross influence.

Thus, each TextView may simply store the first text data to be saved in one of the member variables of the instance of the TextView itself.

Figure 8:
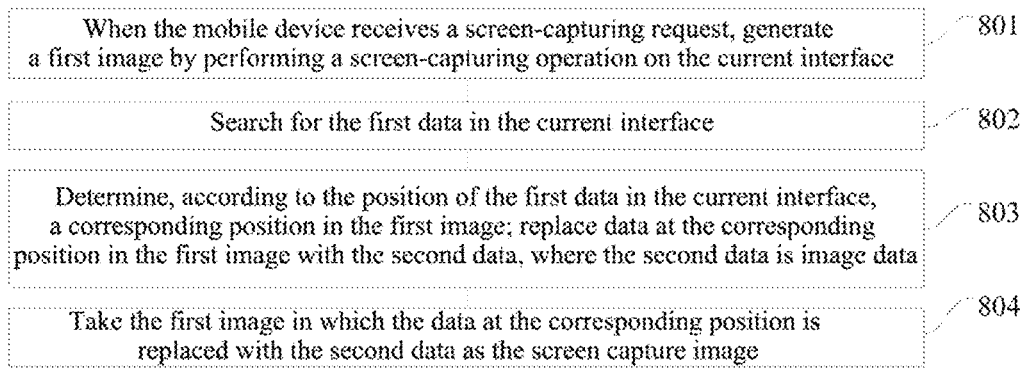
FIG. 8 is a flowchart illustrating a method for capturing a screen on a mobile device according to yet some other embodiments of the present disclosure.

Referring to FIG. 8, where a flowchart illustrates a method for capturing a screen on a mobile device according to some embodiments herein. In these embodiments, the Step 002 will be described in detail mostly taking examples where the first data and the second data are both image data, but the present disclosure is by no means limited thereto. Understandably, the personal information included in the image data may be any type of personal information that might be shown in an image. Step 002 may include the following steps.

Step 801: when the mobile device receives a screen-capturing request, generate a first image by performing a screen-capturing operation on the current interface.

In cases such as a user intending to present content of a conversation conducted through a third party communication tool, the user may trigger a screen-capturing operation to send to a system a screen-capturing request for a current interface, so that the system may perform the screen-capturing operation on the current interface to generate a first image and save the first image as, for example, a bitmap object. The first image generated herein presents the same pattern (including all the text portions and image portions) as that shown on the current interface.

Corresponding settings are added onto the man-machine interface (MMI) of the Android system for the user to decide whether to hide information. If the user responds affirmatively, subsequent steps are performed. Otherwise, normal screen capturing procedure is performed, and all content displayed on the screen are directly captured as the screen capture image.

Step 802: search for the first data in the current interface.

After receiving the screen-capturing request, the system may search the current UI for the first data, e.g. an image. It will be comprehensible that the Step 802 may be executed before, after or simultaneously with the Step 801.

In some embodiments herein, Step 802 may include the follow sub-steps.

Sub-step S41: search for a view group on a top-most layer in the current interface.

Still using the Android system as an example, a system may traverse the top-most window DecorView object, i.e. the root ViewGroup object of the current interface.

Sub-step S42: traverse the view group to search for a view including the first data to obtain a found view.

The system may traverse all ViewGroup objects until the current child view is a View object. Then, the property, size and position of the View object are acquired from property values thereof. Based on information acquired about the View object, determine whether any image information (e.g. imgView type) is contained therein. If it is determined that image information is contained, the image data is determined as the first data, and the view corresponding to the View object is found to include the first data.

The current interface may include at least two images. In such a case, at least two views including an image may be found.

Step 803: determine, according to the position of the first data in the current interface, a corresponding position in the first image; replace data at the corresponding position in the first image with the second data, where the second data is image data.

After the view including the image is found, the system may determine the corresponding position in the first image according to the position information of the found view in the current interface, and may thus replace the data at that position in the first image with the second data. The embodiments herein will be explained by taking the second data being mosaic image data as an example. It should be appreciated that the second data may be any predefined image data.

After the view including the image is found, convert, according to the acquired property, size and position of the View object, the position of the view in the current interface to the position and size relative to the screen, and mark the View object at that position in the first image, e.g. a bitmap object. In case multiple views including the image are found, positions of all such View objects are marked in the first image.

The system may then replace the data at the marked position with mosaic image data.

According to some embodiments, an operation command inputted by the user may be received before the replacement is made, so as to replace data at the corresponding position, which is indicated by the operation command, in the first image with the second data. Particularly, the system may enter into an image editing mode to create a user checkbox at each of the marked positions or areas. If the user selects a position or area by checking that box, image data of that position or area is replaced with mosaic image data. If the user does not select a position or area, no replacement is made for image data at that position or area.

Step 804: take the first image in which the data at the corresponding position is replaced with the second data as the screen capture image.

After the replacement is completed, the first image with the replacement is saved at the screen capture image. Particularly, after the user finishes checking the boxes, or after a certain period expires, the bitmap object is saved as the screen capture image. It will be appreciated that the first image with the replacement will present patterns with part or all of the images being processed to become mosaic patterns.

Figure 9A:
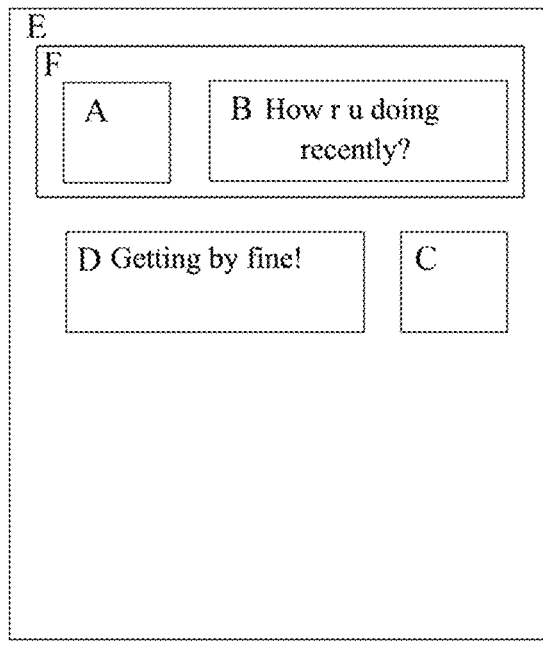
FIGS. 9A-9B are diagrams illustrating screen capturing with anonymity in some embodiments of the present disclosure.
Figure 9B:
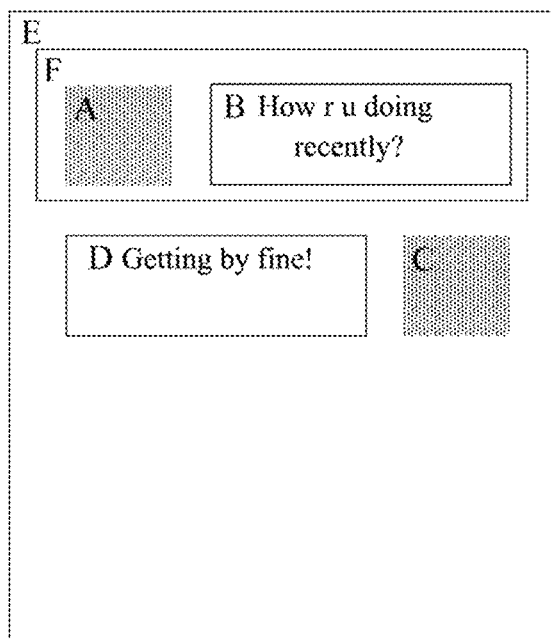

In an application scenario, the current interface of the mobile device is depicted in FIG. 9A. After a screen-capturing request is received from the user, a screen-capturing operation is performed on the current interface to create a bitmap object. Then, the root ViewGroup object of the interface, i.e. the depicted object E, is acquired. All of the child views of the object E are traversed in an order that may be: F view, D view and C view. When the F view is found to be a ViewGroup object, and hence has a child view, the child views thereof, i.e. the A view and B view, are also traversed. Since neither the A view nor the B view has any child view, properties of the A view and B view are judged. Since B view includes a TEXT property, and the information to be masked in the present example is image, the B view may be excluded. Since A view includes image information, the size and position of the A view are acquired and converted to a position relative to the screen, and the View object at that position is marked in the bitmap object. After traversing of child views of the F view is complete, D view and C view are traversed following a similar manner. In the end, the A view and C view, both of which include an image, are marked out in the bitmap object. After all child views have been traversed, a bitmap object editing mode is entered into, and positions of both marked View objects A and C are presented to the user in a rectangular box. If the user selects a position, data in that position is replaced with mosaic image data. After the bitmap processing is completed, the bitmap is saved as an image file, thus obtaining an anonymized screen capture image as depicted in FIG. 9B.

In another application scenario, the text information may be hidden. That is, all texts in the current view may be anonymized. Preferably, the mobile device may, following receiving the screen-capturing request, further receive username data inputted by the user. For example, the current user may key in username "ZHANG San". Then, when it is judged during traversing of the views that a certain view includes the property TEXT, the system may further judge whether the text data in that view matches the username "ZHANG San" inputted by the user. If a match is found, the size and position of the view is acquired and converted to a position relative to the screen, and the View object at that position is marked in the bitmap object. The subsequent processing is similar to the above described application scenario, which will not be repeated herein.

In embodiments herein, a screen capture image is created by replacing the data, which corresponds to part or all images in the current interface, in the image obtained via the screen-capturing operation with predefined second data, which protects the user's privacy while avoiding the need to manually mask the data by starting a dedicated image editing tool to make the anonymization, significantly lowering the relatively high technical threshold of anonymization processing, reducing the error rate, and improving the modification quality of anonymization.

It should be noted that, the method embodiments are set forth as a combination of a series of actions solely for the purpose of making the description more concise, and persons of ordinary skill in the art should appreciate that embodiments herein are not limited to the particular order of actions described herein, and some of the steps may be carried out in alternative orders or simultaneously in accordance with embodiments herein. Moreover, persons of ordinary skill in the art should appreciate that the embodiments described herein are preferred embodiments that may involve actions not necessarily required in the embodiments herein.

Figure 5A:
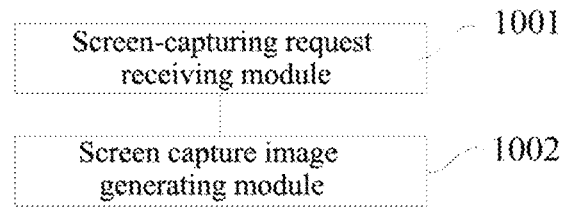
FIG. 5A is a structural block diagram illustrating an apparatus for capturing a screen on a mobile device according to some embodiments of the present disclosure.

Referring to FIG. 5A, which shows a structural block diagram illustrating an apparatus for capturing a screen on a mobile device according to some embodiments of the present disclosure, the apparatus may include the following modules:

a screen-capturing request receiving module 1001, configured to receive, at a mobile device, a screen-capturing request for a current interface, where the current interface includes first data, and the first data includes personal information; and a screen capture image generating module 1002, configured to generate a screen capture image for the current interface according to the screen-capturing request, where the first data in the current interface is replaced with predefined second data.

Figure 5B:
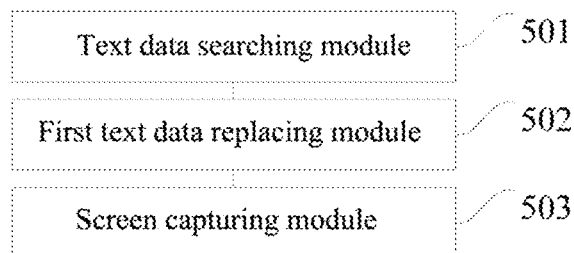
FIG. 5B is a structural block diagram illustrating an apparatus for capturing a screen on a mobile device according to some other embodiments of the present disclosure.

Referring to FIG. 5B, which shows a structural block diagram illustrating an apparatus for capturing a screen on a mobile device according to some embodiments of the present disclosure. On the basis of the apparatus depicted in FIG. 5A, the screen capture image generating module 1002 may include:

a text data searching module 501, configured to search for first text data signifying the username in the current interface when the mobile device receives the screen-capturing request;

a first text data replacing module 502, configured to replace the first text data with the predefined second text data; and a screen capturing module 503, configured to perform, according to the screen-capturing request, a screen-capturing operation on the interface in which the first text data is replaced with the second text data.

In some embodiments herein, the text data searching module 501 may include the follow sub-modules:

a view group searching submodule, configured to search for a view group on a top-most layer in the current interface;

a text view searching submodule, configured to traverse the view group to search for a text view having candidate text data; and a username data matching submodule, configured to, upon judging that the candidate text data matches predefined username data, determine that the candidate text data is the first text data signifying the username.

In some embodiments herein, the first text data replacing module 502 may include the follow sub-modules:

a first replacing submodule, configured to replace all the first text data with the same second text data;

or, a separate text recognizing submodule, configured to recognize separate first text data; and a second replacing submodule, configured to replace the separate first text data with separate second text data.

In some embodiments herein, the first text data replacing module 502 may include the follow sub-modules:

a first redrawing submodule, configured to restart measuring, layout planning and drawing for the text view to which the first text data belongs, and replace the first text data with predefined second text data during the drawing; and a second redrawing submodule, configured to restart measuring, layout planning and drawing for a target view, where the target view is a view in the view group other than the text view to which the first text data belongs.

Figure 6:
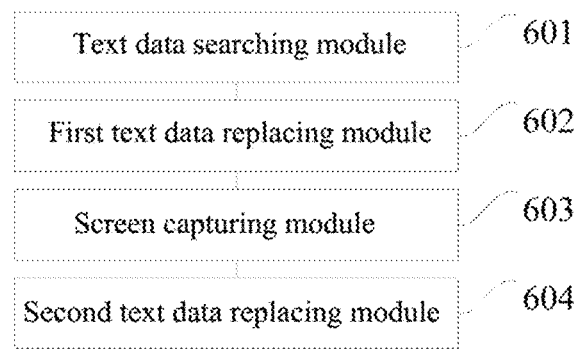
FIG. 6 is a structural block diagram illustrating an apparatus for capturing a screen on a mobile device according to still some other embodiments of the present disclosure.

Referring to FIG. 6, which shows a structural block diagram illustrating an apparatus for capturing a screen on a mobile device according to some embodiments of the present disclosure. On the basis of the apparatus depicted in FIG. 5A, the screen capture image generating module 1002 may include the following modules:

a text data searching module 601, configured to search for first text data signifying the username in the current interface when the mobile device receives the screen-capturing request;

a first text data replacing module 602, configured to replace the first text data with the predefined second text data; and a screen capturing module 603, configured to perform, according to the screen-capturing request, a screen-capturing operation on the interface in which the first text data is replaced with the second text data.

a second text data replacing module 604, configured to replace the second text data in the current interface with the first text data after the screen capture image is generated.

In some embodiments herein, the second text data replacing module 604 may include the follow sub-modules:

a third redrawing submodule, configured to restart measuring, layout planning and drawing for the text view to which the second text data belongs in the current interface, and replace the second text data with the first text data during the drawing; and a fourth redrawing submodule, configured to restart measuring, layout planning and drawing for a target view, where the target view is a view in the view group other than the text view to which the second text data belongs.

Figure 7:
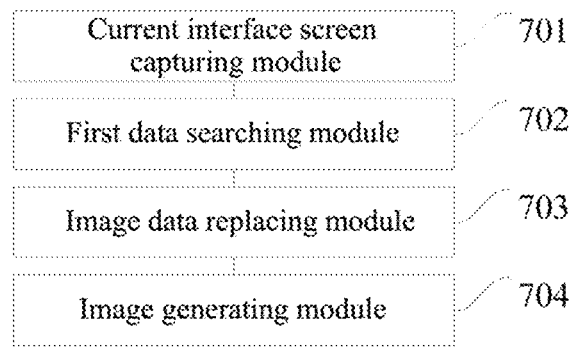
FIG. 7 is a block diagram illustrating an apparatus for capturing a screen on a mobile device according to yet some other embodiments of the present disclosure.

Now reference is made to FIG. 7, which shows a structural block diagram illustrating an apparatus for capturing a screen on a mobile device according to some embodiments of the present disclosure. On the basis of the apparatus depicted in FIG. 5A, the screen capture image generating module 1002 may include:

a current interface screen capturing module 701, configured to generate a first image by performing a screen-capturing operation on the current interface;

a first data searching module 702, configured to search for the first data in the current interface;

an image data replacing module 703, configured to determine, according to a position of the first data in the current interface, a corresponding position in the first image, and replace data at the corresponding position in the first image with the second data, where the second data is image data; and an image generating module 704, configured to take the first image in which the data at the corresponding position is replaced with the second text data as the screen capture image.

In some embodiments herein, the first data searching module 702 may include the follow sub-modules:

a view group searching submodule, configured to search for a view group on a top-most layer in the current interface; and a view searching submodule, configured to traverse the view group to search for a view including the first data to obtain a found view.

In some embodiments herein, the image data replacing module 703 may include the follow sub-modules:

a first locating submodule, configured to determine, according to a position of the found view in the current interface, a corresponding position in the first image; and a first replacing submodule, configured to replace data at the corresponding position in the first image with the second data.

In some embodiments herein, the image data replacing module 703 may include the follow sub-modules:

a second replacing submodule, configured to receive an operation command inputted by a user, and replace data at the corresponding position, which is indicated by the operation command, in the first image with the second data.

The present disclosure further provides an apparatus for capturing a screen on a mobile device, including a processor and a non-transitory processor-readable medium including computer-executable instructions executed by the computing hardware to perform, on the apparatus, operations including: receiving, at the mobile device, a screen-capturing request for a current interface, where the current interface includes first data, and the first data includes personal information; and generating, according to the screen-capturing request, a screen capture image for the current interface, where the first data in the current interface is replaced in the screen capture image with predefined second data.

Further, the operations may also include those described in any of the above methods for capturing a screen on a mobile device. For the particulars, the above parts of the method embodiments may be referred to.

Since the apparatus embodiments are substantially similar to the method embodiments, only a relatively simple description is given, and similar parts of the method embodiments may be referred to for the apparatus embodiments.

The present disclosure further provides a non-transitory computer-readable medium, storing an instruction set that, when being executed, causes a machine to perform a method for capturing a screen on a mobile device, where the method includes:

receiving, at the mobile device, a screen-capturing request for a current interface, where the current interface includes first data, and the first data includes personal information; and generating, according to the screen-capturing request, a screen capture image for the current interface, where the first data in the current interface is replaced in the screen capture image with predefined second data.

Further, the instruction set may, when being executed, causes the machine to perform any of the above described methods for capturing a screen on a mobile device. For the particulars, the above parts of the method embodiments may be referred to.

Embodiments of the present disclosure are described progressively, focusing on the feature(s) that distinguish(es) an embodiment from other embodiment(s). For the parts similar between or among the embodiments, a simple cross-reference may be made.

It should be appreciated by those of ordinary skills in the art that, embodiments herein may be offered in the form of a method, apparatus or computer program product. Therefore, the disclosure may adopt embodiments in forms of hardware only, software only, or a combination of software and hardware. Moreover, embodiments of the disclosure may adopt forms of computer program products implemented on one or more computer usable storage medium (including but not limited to disk storage, CD-ROM and optical storage, etc.) containing computer usable program codes.

Embodiments herein are described with reference to the flowcharts and/or block diagrams of the method, the terminal device (system) and the computer program product according to the embodiments of the disclosure. It should be understood that, each process and/or block in the flowcharts and/or block diagrams, and combinations of processes and/or blocks in the flowcharts and/or block diagrams, may be realized by computer program instructions. These computer program instructions may be provided to a general-purpose computer, a special-purpose computer, an embedded processor, or processors of other programmable data processing devices, so as to create a machine, such that a device for realizing functions designated in one or more processes in the flowcharts and/or in one or more blocks in the block diagrams, may be created by instructions executed by processors of a computer or other programmable data processing devices.

These computer program instructions may also be stored in a computer readable storage that can guide a computer or other programmable data processing devices to work in a way, such that a manufactured product containing an instruction device may be created by the instructions stored in the computer readable storage, and the instruction device realizes the functions designated in one or more processes in the flowcharts and/or in one or more blocks in the block diagrams.

These computer program instructions may also be loaded into a computer or other programmable data processing devices, such that a series of operating steps may be performed on the computer or other programmable data processing devices, so as to generate processes realized by the computer, such that steps for realizing the functions designated in one or more processes in the flowcharts and/or in one or more blocks in the block diagrams may be provided by the instructions executed on the computer or other programmable data processing devices.

Lastly, it should also be noted that, as used herein, relation terms such as "first" and "second" are used merely to distinguish an entity or an operation from another entity or another operation, without necessarily requiring or implying that any such substantial relation or order actually exists between or among these entities or operations. Moreover, terms "include", "contain" or any variation thereof are intended to cover an nonexclusive containing, such that a process, a method, an item or a device containing a series of elements not only includes these elements, but also includes other elements that are not set forth, or also includes an inherent element of such a process, method, item or device. Without further limitation, an element defined by a phrase "include a" does not mean that other identical elements are excluded from the process, method, item or device including the same element.

The method and apparatus for capturing a screen on a mobile device provided in the present disclosure are introduced in detail in the foregoing, with the principals and implementation modes of the present disclosure being explained using cases herein. The above descriptions about the embodiments are merely employed to help understanding the methodologies and essential ideas of the present disclosure. Meanwhile, those of ordinary skills in the art will make modifications with regard to both embodiments and scopes of application. In view of the foregoing, content of the present description shall not be interpreted as limitations imposed on the present disclosure.

What is claimed is:

1. A method for capturing a screen on a mobile device, comprising:
    receiving, at the mobile device, a screen-capturing request for a current interface, wherein the current interface comprises first text data, and the first text data comprises personal information;
    determining whether the mobile device is set in a normal screen capture mode or secure screen capture mode; and
    upon determining that the mobile device is set in the secure screen capture mode:
        determining a view group on a top layer of the current interface;
        searching the view group for text views;
        upon determining that text data of a first text view among the text views match the first text data containing the personal information, remeasuring and redrawing the first text view in the current interface to generate a replacement interface by replacing the first text data with a second predefined text data;
        generating, according to the screen-capturing request, a screen capture image for the replacement interface; and
        replacing the second predefined text data in the replacement interface with the first text data after the screen capture image is generated.

2. The method according to claim 1, wherein the personal information comprises information associated with a username.

3. The method according to claim 1, further comprising remeasuring and redrawing other views of the view group while remeasuring and redrawing the first text view.

4. A mobile device, comprising a processor and a memory for storing instructions, wherein the processor, when executing the instructions, is configured to cause the mobile device to:
    receive a screen-capturing request for a current interface of the mobile device, wherein the current interface comprises first text data, and the first text data comprises personal information;
    determine whether the mobile device is set in a normal screen capture mode or secure screen capture mode; and
    upon determine that the mobile device is set in the secure screen capture mode:
        determine a view group on a top layer of the current interface;
        search the view group for text views;
        upon determine that text data of a first text view among the text views match the first text data containing the personal information, remeasure and redraw the first text view in the current interface to generate a replacement interface by replacing the first text data with a second predefined text data;
        generate, according to the screen-capturing request, a screen capture image for the replacement interface; and
        replacing the second predefined text data in the replacement interface with the first text data after the screen capture image is generated.

5. The mobile device according to claim 4, wherein the personal information comprises information associated with a username.

6. The mobile device according to claim 4, wherein the processor, when executing the instructions, is further configured to cause the mobile device to: remeasure and redraw other views of the view group while remeasuring and redrawing the first text view.

7. A non-transitory computer-readable medium, storing an instruction set that, when being executed, causes a machine to perform a method for capturing a screen on a mobile device, wherein the method comprises:
    receiving, at the mobile device, a screen-capturing request for a current interface, wherein the current interface comprises first text data, and the first text data comprises personal information;
    determining whether the mobile device is set in a normal screen capture mode or secure screen capture mode; and
    upon determining that the mobile device is set in the secure screen capture mode:
        determining a view group on a top layer of the current interface;
        searching the view group for text views;
        upon determining that text data of a first text view among the text views match the first text data containing the personal information, remeasuring and redrawing the first text view in the current interface to generate a replacement interface by replacing the first text data with a second predefined text data;
        generating, according to the screen-capturing request, a screen capture image for the replacement interface; and
        replacing the second predefined text data in the replacement interface with the first text data after the screen capture image is generate.

8. The method of claim 1, further comprising: upon determining that the mobile device is set on the normal screen capture mode, generating, according to the screen-capturing request, a screen capture image for the current interface.

9. The method of claim 1, further comprising prompting a user of the mobile device to select between the normal screen capture mode or secure screen capture mode upon receiving the screen-capturing request.

10. The method of claim 1, wherein the mobile device include a system setting for setting the mobile device in the normal screen capture mode or secure screen capture mode.

11. The method of claim 1, wherein the current interface comprises an instant messaging interface.

12. The mobile device of claim 4, wherein the processor, when executing the instructions, is further configured to cause the mobile device to: upon determining that the mobile device is set on the normal screen capture mode, generate, according to the screen-capturing request, a screen capture image for the current interface.

13. The mobile device of claim 4, wherein the processor, when executing the instructions, is further configured to cause the mobile device to: prompt a user of the mobile device to select between the normal screen capture mode or secure screen capture mode upon receiving the screen-capturing request.

14. The mobile device of claim 4, further including a system setting for setting the mobile device in the normal screen capture mode or secure screen capture mode.

15. The mobile device of claim 4, wherein the current interface comprises an instant messaging interface.

\* \* \* \* \*